(12) United States Patent
Chung et al.

(10) Patent No.: US 6,713,595 B2
(45) Date of Patent: Mar. 30, 2004

(54) COPOLYESTER RESIN COMPOSITION AND A PROCESS OF PREPARATION THEREOF

(75) Inventors: Hyun Soo Chung, Seoul (KR); Jae Wang Lee, Seoul (KR); Dong Hoon Kim, Seoul (KR); Do Youn Kim, Seoul (KR); Suok Woo Lee, Kangwon-do (KR)

(73) Assignee: IRE Chemical Ltd., Seoul (KR)

( * ) Notice: Subject to any disclaimer, the term of this patent is extended or adjusted under 35 U.S.C. 154(b) by 0 days.

(21) Appl. No.: 09/732,765

(22) Filed: Dec. 11, 2000

(65) Prior Publication Data

US 2001/0007899 A1 Jul. 12, 2001

(30) Foreign Application Priority Data

Dec. 11, 1999 (KR) ............................................. 99-56991

(51) Int. Cl.[7] ...................... C08G 63/78; C08G 63/82; C08G 63/87; C08K 5/52; C08L 67/00
(52) U.S. Cl. ...................... 528/279; 524/141; 524/145; 524/601
(58) Field of Search .......................... 528/279; 524/141, 524/145, 601

(56) References Cited

U.S. PATENT DOCUMENTS

| 5,128,439 | A |   | 7/1992 | Sartori et al. |
| 5,455,311 | A | * | 10/1995 | Grigat et al. |
| 5,661,193 | A |   | 8/1997 | Khemani |
| 5,843,573 | A |   | 12/1998 | Itoh et al. |

FOREIGN PATENT DOCUMENTS

| KR | 95-25072 | 9/1995 |
| KR | 120828 | 10/1997 |
| KR | 121998 | 11/1997 |
| WO | WO 95/03347 | 2/1995 |
| WO | WO 96/25448 | 8/1996 |

OTHER PUBLICATIONS

European Search Report for EP 00 31 0993 Mar. 12, 2001.

* cited by examiner

Primary Examiner—Patrick D. Niland
(74) Attorney, Agent, or Firm—Shanks & Herbert

(57) ABSTRACT

The present invention provides a copolyester resin composition which has good physical properties, biodegradability and processability and a process for preparing and/or producing the same. To improve the biodegradability and physical properties of the copolyester, the present invention applied multi-stage reaction step, and copolyester resin having number average molecular weight of from 30,000 to 70,000, weight average molecular weight of from 100,000 to 600,000, melting point of from 55° C. to 120° C., and melt index of from 0.1 to 30 g/10 minute (190° C., 2,160 g) is obtained. The processability and physical properties of the copolyester resin of the present invention has been greatly enhanced by incorporating (i) an "aromatic-aliphatic prepolymers" having number average molecular weight of from 300 to 30,000 and the contiguous repeating unit of aromatic group in the dicarboxylic acid position of "aromatic-aliphatic prepolymers" is less than 5. Thus it can be processed by using the conventional processing equipment for polyethylene and polypropylene without any modification.

15 Claims, No Drawings

COPOLYESTER RESIN COMPOSITION AND A PROCESS OF PREPARATION THEREOF

FIELD OF THE INVENTION

The present invention relates to copolyester resin composition which has good physical properties and biodegradability and a process for preparing and/or producing the same which is suitable for various applications, such as films, moldings, and fiber. More particularly, the present invention have solved a problem of poor physical properties, especially tensile strength and tear strength, so it can be used in many practical uses including packaging film and trash bags.

DESCRIPTION OF THE RELATED ARTS

Many aliphatic polyester resin compositions have been published in the literature, and they completely biodegrade in the environment. But they have difficulty in commercializing because of high cost, poor physical properties and inferior processability comparing to the conventional polymers such as polyethylene, polypropylene and polystyrene.

The typical polyester resin used for various products including textures, fibers, moldings, formings, films, etc, is a high molecular weight aromatic polyester resin produced by the polycondensation reaction of terephthalic acid with ethylene glycol, or terephthalic acid with 1,4-butanediol. The high molecular weight polyester resin is a polymer having a number average molecular weight of over 10,000. Such aromatic polyester resins are not degradable naturally so it is a serious, worldwide of environmental concern.

Otherwise, the aliphatic polyester resins are known as being biodegradable (J.Macromol. Sci.-Chem., A23(3), pp.393–409 (1986)). They have a variety of usage in the medical and agricultural fields, and other applications are being developed.

However, the conventional aliphatic polyester resin has a low melting point and a high melt index, because of the structure of the main chain and the crystallinity thereof, and having low heat resistance and unsatisfactory mechanical properties, the usage of this polymer material has been limited. In order to utilize this aliphatic polyester resin, it should have a number average molecular weight of more than 30,000. However, it is difficult to manufacture the aliphatic polyester resins having a number average molecular weight of more than 15,000 using the conventional polycondensation reaction system because further growth reaction is surpassed by decomposition reaction due to the poor heat stability of aliphatic polyesters.

In order to solve this problem, Korean Laid-Open Patent No. 95-758 discloses the process of preparing high molecular weighted aliphatic polyester resin having a number average molecular weight of more than 30,000, by controlling the reaction temperature, the degree of vacuum and the amount of catalyst. However, this aliphatic polyester resin has poor processability because of its low weight average molecular weight and low heat stability.

In another method, Korean Laid-Open Patent No. 95-114171 discloses the process of preparing the high molecular weighted aliphatic polyester resin by introducing monomer which containing poly(at least three)-functional groups, where the recommended functional group is hydroxy group(—OH) or carboxylic group(—COOH). According to this process, by introducing the monomer, the reaction time can be reduced and the processability of the resin can be enhanced by broadening molecular weight distribution. However, the utilization of the polyester resin thereof is very difficult because the physical property such as a tensile strength is poor due to the increased amount of low molecular weight portions. Furthermore, it is difficult to control the reaction for preparing the polyester resin, because the polyester resin easily becomes a gel type.

In yet another process for increasing the molecular weight of the aliphatic polyester resin, Korean Laid-Open Patent No. 95-25072 discloses the high molecular weighted aliphatic polyester resin produced by using isocyanate as a coupling agent reacting to an aliphatic polyester resin having a number average molecular weight of from 15,000 to 20,000, which is produced by de-hydration reaction or de-glycol reaction of (1) an aliphatic (including cyclic type), and (2) an aliphatic (including cyclic type) dicarboxylic acid (or an acid anhydride thereof), and a little of (3) monomer of polyhydric alcohol or polyhydric carboxylic acid (or acid anhydride thereof). According to the application, the aliphatic polyester resin has a number average molecular weight of from 20,000 to 70,000. However, this process requires more time for the reaction which leads to the poor production yield. And the isocyanate used as a coupling agent to increase the molecular weight is harmful to the human body so it needs to be handled carefully.

In yet another process for increasing the molecular weight of the aliphatic polyester resin, U.S. Pat. No. 5,843,573 discloses the high molecular weighted aliphatic polyester resin produced by using twin-screw extruder. However this process is very complicated and requires more time for the reaction.

In yet another process for increasing the molecular weight of the aliphatic polyester resin, World Patent WO9503347A1 discloses the high molecular weighted aliphatic polyester resin produced by using diethylene glycol as a glycol ingredient. However this process requires more time for the reaction, and the product is not desirable for practical use because of its low melting point and poor physical properties.

In the conventional process as mentioned above, it has been used to introduce a coupling agent like an isocyanate or a monomer such as a polyhydric alcohol or polyhydric carboxylic acid. These conventional processes have many problems such as low production yields, poor physical properties and/or poor processability.

SUMMARY OF THE INVENTION

The present invention provides a copolyester resin composition which has good physical properties, biodegradability and processability and a process for preparing and/or producing the same. To improve the biodegradability and physical properties of the copolyester, the present invention applied multi-stage reaction step, and copolyester resin having number average molecular weight of from 30,000 to 70,000, weight average molecular weight of from 100,000 to 600,000, melting point of from 55° C. to 120° C., and melt index of from 0.1 to 30 g/10 minute (190° C., 2,160 g) is obtained. The processability and physical properties of the copolyester resin of the present invention has been greatly enhanced by incorporating (i) an "aromatic-aliphatic prepolymers" having number average molecular weight of from 300 to 30,000 and the contiguous repeating unit of aromatic group in the dicarboxylic acid position of "aromatic-aliphatic prepolymers" is less than 5. Thus it can be processed by using the conventional processing equipment for polyethylene and polypropylene without any modification.

To solve the above mentioned problems, the present inventors applied multi-stage reaction step. The copolyester resin composition according to the present invention would be described in detail hereinafter.

In the first reaction step, the oligomer-like substances (hereinafter, referred to as "aromatic-aliphatic prepolymers") having number average molecular weights of from 300 to 30,000 and the contiguous repeating unit of aromatic group in the dicarboxylic acid position of "aromatic-aliphatic prepolymers" is less than 5, is obtained through one or a plurality of condensation, esterification and ester-exchange reaction with three ingredients;

(a) one or a plurality of aromatic dicarboxylic acid (or an acid anhydride thereof) which containing aromatic group in the molecule, selected from dimethyl terephthalate, terephthalic acid, phthalic acid, phthalic anhydride, isophthalic acid, 4-methylphthalic acid, 4-methylphthalic anhydride, dimethyl phthalate;

(b) one or a plurality of aliphatic (including cyclic type) dicarboxylic acid (or an acid anhydride thereof) ingredient selected from succinic acid, glutaric acid, adipic acid, pimelic acid, suberic acid, azelaic acid, sebacic acid, 1,9-nonanedicarboxylic acid, 1,10-decanedicarboxylic acid; and (c) one or a plurality of aliphatic (including cyclic type) glycol selected from ethylene glycol, diethylene glycol, triethylene glycol, tetraethylene glycol, propylene glycol, 1,3-propanediol, 1,3-butanediol, 1,4-butanediol, neopentyl glycol, 1,5-pentanediol, 1,6-hexanediol, 1,7-heptanediol, 1,2-octanediol, 1,8-octanediol, 1,9-nonanediol, 1,2-decanediol, 1,10-decanediol, decamethylene glycol Next, in the second reaction step, with the existence of (i) an "aromatic-aliphatic prepolymers" which was produced in the first reaction step, from 0.1 wt % to 30 wt %, (ii) one or a plurality of aliphatic (including cyclic type) dicarboxylic acid (or an acid anhydride thereof) ingredient selected from succinic acid, glutaric acid, adipic acid, pimelic acid, suberic acid, azelaic acid, sebacic acid, 1,9-nonanedicarboxylic acid, 1,10-decanedicarboxylic acid, from 40 wt % to 71 wt %, and (iii) one or a plurality of aliphatic (including cyclic type) glycol selected from ethylene glycol, diethylene glycol, triethylene glycol, tetraethylene glycol, propylene glycol, 1,3-propanediol, 1,3-butanediol, 1,4-butanediol, neopentyl glycol, 1,5-pentanediol, 1,6-hexanediol, 1,7-heptanediol, 1,2-octanediol, 1,8-octanediol, 1,9-nonanediol, 1,2-decanediol, 1,10-decanediol, decamethylene glycol, from 29 wt % to 60 wt %, are added, and one or a plurality of esterification and ester-exchange reaction are performed and thus obtain the polymeric resin.

Finally, in the third reaction step, by polycondensing the polymeric resin which was produced in the second reaction step, a copolyester with number average molecular weight of from 30,000 to 70,000, weight average molecular weight of from 100,000 to 600,000, melting point of from 55° C. to 120° C., and melt index of from 0.1 to 30 g/10 minute (190° C., 2,160 g) is obtained.

To describe in more detail about the copolyester resin composition of the present invention, in the first reaction step, (i) an "aromatic-aliphatic prepolymers" having number average molecular weights of from 300 to 30,000 and the contiguous repeating unit of aromatic group in the dicarboxylic acid position of "aromatic-aliphatic prepolymers" is less than 5, are obtained by performing reactions which are selected from at least one of the following reactions; condensation reaction, or an esterification reaction, or an ester-exchange reaction, with (a) one or a plurality of aromatic dicarboxylic acid (or an acid anhydride thereof) which containing aromatic group in the molecule, including dimethyl terephthalate and terephthalic acid; (b) one or a plurality of aliphatic (including cyclic type) dicarboxylic acid (or an acid anhydride thereof) ingredient including succinic acid; and (c) one or a plurality of aliphatic (including cyclic type) glycol selected from at least one of 1,4-butanediol and ethylene glycol, preferably one of ① succinic acid alone; ethylene glycol alone or mixture of ethylene glycol and other glycol (C3–C10 alkylene, C4–C10 cycloalkylene); aromatic dicarboxylic acid (dimethyl terephthalate, terephthalic acid), ② succinic acid alone; 1,4-butanediol alone or mixture of 1,4-butanediol and other glycol (C2–C3 and C5–C10 alkylene, C4–C10 cycloalkylene); aromatic dicarboxylic acid (dimethyl terephthalate, terephthalic acid), ③ succinic acid alone or mixture of succinic acid and other dicarboxylic acid (C3–C10 alkylene, C4–C10 cycloalkylene); ethylene glycol alone; aromatic dicarboxylic acid (dimethyl terephthalate, terephthalic acid), ④ succinic acid alone or mixture of succinic acid and other dicarboxylic acid (C3–C10 alkylene, C4–C10 cycloalkylene); 1,4-butanediol alone; aromatic dicarboxylic acid (dimethyl terephthalate, terephthalic acid), ⑤ succinic acid alone or mixture of succinic acid and other dicarboxylic acid (C3–C10 alkylene, C4–C10 cycloalkylene); ethylene glycol alone or mixture of ethylene glycol and other glycol (C3–C10 alkylene, C4–C10 cycloalkylene); aromatic dicarboxylic acid (dimethyl terephthalate, terephthalic acid), ⑥ succinic acid alone or mixture of succinic acid and other dicarboxylic acid (C3–C10 alkylene, C4–C10 cycloalkylene); 1,4-butanediol alone or mixture of 1,4-butanediol and other glycol (C2–C3 and C5–C10 alkylene, C4–C10 cycloalkylene); aromatic dicarboxylic acid (dimethyl terephthalate, terephthalic acid).

Next, in the second reaction step, with the existence of from 0.1 wt % to 30 wt % of (i) an "aromatic-aliphatic prepolymers" which was produced in the first reaction step, (ii) one or a plurality of aliphatic (including cyclic type) dicarboxylic (or an acid anhydride thereof) ingredient including succinic acid; and (iii) one or a plurality of aliphatic (including cyclic type) glycol selected from at least one of 1,4-butanediol and ethylene glycol, preferably one of ① succinic acid alone; ethylene glycol alone or mixture of ethylene glycol and other glycol (C3–C10 alkylene, C4–C10 cycloalkylene), ② succinic acid alone; 1,4-butanediol alone or mixture of 1,4-butanediol and other glycol (C2–C3 and C5–C10 alkylene, C4–C10 cycloalkylene), ③ succinic acid alone or mixture of succinic acid and other dicarboxylic acid (C3–C10 alkylene, C4–C10 cycloalkylene); ethylene glycol alone, ④ succinic acid alone or mixture of succinic acid and other dicarboxylic acid (C3–C10 alkylene, C4–C10 cycloalkylene); 1,4-butanediol alone, ⑤ succinic acid alone or mixture of succinic acid and other dicarboxylic acid (C3–C10 alkylene, C4–C10 cycloalkylene); ethylene glycol alone or mixture of ethylene glycol and other glycol (C3–C10 alkylene, C4–C10 cycloalkylene), ⑥ succinic acid alone or mixture of succinic acid and other dicarboxylic acid (C3–C10 alkylene, C4–C10 cycloalkylene); 1,4-butanediol alone or mixture of 1,4-butanediol and other glycol (C2–C3 and C5–C10 alkylene, C4–C10 cycloalkylene), are added, and one or a plurality of esterification and ester-exchange reaction are performed and thus obtain the polymeric resin after water or methanol is extracted.

The present invention provides a process for preparing and/or producing above mentioned copolyester resin comprising three reaction steps which are described below in detail.

In the first reaction step, (i) an "aromatic-aliphatic prepolymers" having number average molecular weights of from 300 to 30,000 and the contiguous repeating unit of aromatic group in the dicarboxylic acid position of "aromatic-aliphatic prepolymers" is less than 5, is obtained by performing reactions which are selected from at least one of the following reactions; condensation reaction, or an esterification reaction, or an ester-exchange reaction, at the temperature of from 160° C. to 240° C., with (a) one or a plurality of aromatic dicarboxylic acid (or an acid anhydride thereof) which containing aromatic group in the molecule including dimethyl terephthalate and terephthalic acid, (b) one or a plurality of aliphatic (including cyclic type) dicarboxylic acid (or an acid anhydride thereof) ingredient including succinic acid, and (c) one or a plurality of aliphatic (including cyclic type) glycol selected from at least one of 1,4-butanediol and ethylene glycol, and the produced water or methanol is extracted. If the reaction temperature is lower than 160° C., the produced water or methanol cannot easily extracted. If the reaction temperature is higher than 240° C., the reactant can be decomposed due to thermal degradation.

To describe in more detail, at first, (a) one or a plurality of aromatic dicarboxylic acid (or an acid anhydride thereof) which containing aromatic group in the molecule, including dimethyl terephthalate and terephthalic acid, and (c) one or a plurality of aliphatic (including cyclic type) glycol selected from at least one of 1,4-butanediol and ethylene glycol, are added and react to produce water or methanol by performing reactions selected from at least one of the following reaction; condensation reaction, or esterification reaction, or ester-exchange reaction, at the temperature of from 180° C. to 220° C. where the aromatic dicarboxylic acid become activated to react with the aliphatic glycol. Then after the produced water or methanol is extracted thereof, at the temperature of from 160° C. to 180° C. where the aromatic dicarboxylic acid become deactivated to react with the aliphatic glycol, (b) one or a plurality of aliphatic (including cyclic type) dicarboxylic acid (or an acid anhydride thereof) ingredient including succinic acid, is added to produce (i) an "aromatic-aliphatic prepolymers" having number average molecular weights of from 300 to 30,000 and the contiguous repeating unit of aromatic group in the dicarboxylic acid position of "aromatic-aliphatic prepolymers" is less than 5, by performing reactions which are selected from at least one of the following reactions; condensation reaction, or esterification reaction, or ester-exchange reaction. Because the contiguous repeating unit of aromatic group in the dicarboxylic acid position of "aromatic-aliphatic prepolymers" is less than 5, the biodegradability of the copolyester does not affected. During the reaction process, the chemical reaction is represented by the following formula (I), wherein terephthalic acid is employed for the (a) aromatic dicarboxylic acid (or an acid anhydride thereof) which containing aromatic group in the molecule, succinic acid is employed for the (b) aliphatic (including cyclic type) dicarboxylic acid (or an acid anhydride thereof) ingredient, and 1,4-butanediol is employed for the (c) aliphatic (including cyclic type) glycol.

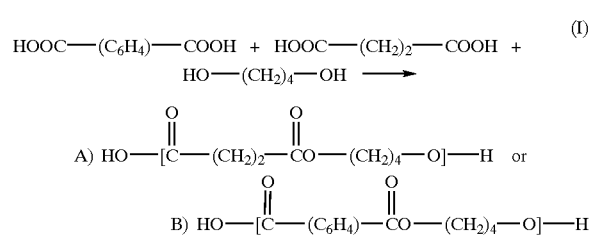

The product A) and/or B) from the reaction according to the formula (I) distribute randomly in the "aromatic-aliphatic prepolymers", and can be represented by the following formula (II).

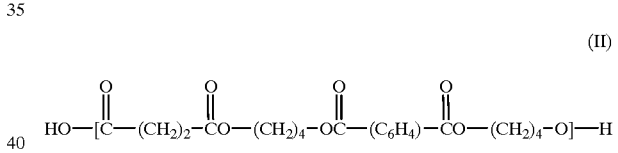

Wherein the number average molecular weight of "aromatic-aliphatic prepolymers" is from 300 to 30,000 and the contiguous repeating unit of aromatic group in the dicarboxylic acid position of "aromatic-aliphatic prepolymers" is less than 5.

To produce (i) an "aromatic-aliphatic prepolymers" having number average molecular weight of from 300 to 30,000 and the contiguous repeating unit of aromatic group in the dicarboxylic acid position of "aromatic-aliphatic prepolymers" is less than 5, in the first reaction step, for 1.0 mole of total dicarboxylic acid (sum of (a) and (b)) which is added in the first reaction step, the mole ratio of (c) aliphatic (including cyclic type) glycol is from 1.1 mole to 1.5 mole. And for dicarboxylic acids ingredient which are added in the first reaction step, the mole ratio of aromatic component to aliphatic component is in the range from 0.2:0.8 to 0.8:0.2. If the mole ratio is less than 0.2:0.8, the reactivity decreases and the copolyester resin has poor physical properties and color. If the mole ratio is higher than 0.8:0.2, the rate of biodegradation decreases. And the preferable mole ratio among (a) aromatic dicarboxylic acid (or an acid anhydride thereof): (b) aliphatic (including cyclic type) dicarboxylic acid (or an acid anhydride thereof): (c) aliphatic (including cyclic type) glycol is 0.45:0.55:1.35.

Then, in the second reaction step, with the existence of (i) an "aromatic-aliphatic prepolymers" which was produced in the first reaction step, (ii) one or a plurality of aliphatic (including cyclic type) dicarboxylic acid (or an acid anhydride thereof) ingredient including succinic acid, and (iii) one or a plurality of aliphatic (including cyclic type) glycol selected from at least one of 1,4-butanediol and ethylene glycol are added, and at the temperature of from 200° C. to 220° C., one or a plurality of esterification and ester-exchange reaction are performed. After the produced water or methanol is extracted, polymeric resin is obtained. The amount of the (i) "aromatic-aliphatic prepolymers" ranges from 0.1 wt % to 30 wt %. If the amount of the (i) "aromatic-aliphatic prepolymers" is less than 0.1 wt %, not only the reaction time becomes longer but also the physical properties become poorer. If the amount of the (i) "aromatic-aliphatic prepolymers" is more than 30 wt %, the rate of biodegradation becomes slow and the melting point gets lower so it is difficult to process by plastic processing equipment.

Finally, in the third reaction step, by polycondensing the polymeric resin which was produced in the second reaction step, at the temperature of from 210° C. to 270° C. and 0.005~10 Torr, a copolyester resin with number average molecular weight of from 30,000 to 70,000, weight average molecular weight of from 100,000 to 600,000, melting point of from 55° C. to 120° C., and melt index of from 0.1 to 30 g/10 minute (190° C., 2,160 g) is obtained.

At the start of and/or the end of the esterification or ester-exchange reaction in the first and second reaction step, catalyst alone or mixture of a plurality of catalysts can be added, wherein the amount of the catalyst(s) is preferably in the range of from 0.02 wt % to 2.0 wt % of total reactants. If the amount of catalyst employed is less than 0.02 wt %, it takes long time to extract the theoretical amount of water, methanol or glycol, or it is impossible to extract. If the amount of the catalyst employed is more than 2.0 wt %, the color of the product is poor even though the theoretical amount of water, methanol or glycol is easily extracted. The catalysts are selected from one or a plurality of the metallic compounds consisting Ti, Ge, Zn, Fe, Mn, Co, and Zr, preferably, an organic metallic compound consisting titanate, antimonate or tin oxide, more preferably, selected from one or a plurality of tetrabutyl titanate, calcium acetate, antimony trioxide, dibutyltin oxide, zinc acetate, antimony acetate, antimony glycolate, tetrapropyl titanate.

Additionally, at the start of and/or the end of the esterification or ester-exchange reaction in the first and second reaction step, a stabilizer should be added wherein the amount of the stabilizer employed preferably ranges from 0.02 wt % to 2.0 wt %. If the amount of the stabilizer used is less than 0.02 wt %, the effect of the stabilizer is not sufficient and the color of the copolyester is yellow or brown. If the amount of the stabilizer exceeds 2.0 wt %, the time required for the reaction is extended and the product would not have high molecular weight. Therefore, the preferable amount of the stabilizer is about 0.22 wt %, and the stabilizer used is at least one or a plurality selected from phosphatic stabilizers consisting trimethyl phosphate, phosphoric acid and triphenyl phosphate.

The copolyester in the present invention is obtained by performing the multi-stage reaction step, and the number average molecular weight is from 30,000 to 70,000, the weight average molecular weight is from 100,000 to 600,000, the melting point is from 55° C. to 120° C., and the melt index is from 0.1 to 30 g/10 minute (190° C., 2,160 g). Because of the enhanced physical properties and processability of the copolyester resin according to the present invention, it is possible to use for packaging film and trash bags.

Having this invention described in general, a further understanding can be obtained with reference to certain specific examples which are provided hereinafter for the purpose of illustration only and are not intended to be limited unless otherwise specified.

EXAMPLES

In the following examples, the tensile strength, elongation at break of the films were measured by ASTM D882 after the copolyester was press-formed about 150 μm thickness; the tear strength was measured by ASTM D1922 with 40 μm thickness blown film. Melt index (MI) was measured by ASTM D1238, where the temperature was 190° C. and the load was 2,160 g. The melting point was measured by using differential scanning calorimetry (DSC) with the scan rate of 10° C./minute. Molecular weights are measured by gel permeation chromatography (GPC) and are based on polystyrene equivalent molecular weights. And the processability was determined whether it can be processed with conventional low density polyethylene (LDPE) blown film extruder.

Example 1

First, after purging a 500 ml reactor with nitrogen, 19.2 g of dimethyl terephthalate and 27 g of 1,4-butanediol are added to a reactor, and the mixture is ester-exchange reacted until the approximate theoretical amount of methanol is produced at the temperature of 200° C. And then, 11.8 g of succinic acid is added thereto, and the mixture is esterified until the approximate theoretical amount of water is produced at the temperature of 180° C., thus obtain 39.4 g of "aromatic-aliphatic prepolymers" wherein the number average molecular weight of "aromatic-aliphatic prepolymers" is approximately 500.

And then, 118 g of succinic acid, 135 g of 1,4-butanediol and 0.3 g of tetrabutyl titanate acting as a catalyst are added thereto, and it reacts for 2 hours until the approximate theoretical amount of water is produced at the temperature of 200° C. At the end of this reaction step, 0.1 g of antimony trioxide, 0.2 g of dibutyltin oxide and 0.07 g of tetrabutyl titanate acting as catalysts and 0.2 g of trimethyl phosphate acting as a stabilizer are added thereto.

Finally, the temperature is elevated to 245° C. and polycondensation (or condensation-polymerization) is allowed to proceed for 210 minutes under 0.3 Torr vacuum condition.

The product has a melt index of 3 g/10 min. (190° C., 2,160 g), a number average molecular weight of 47,000, a weight average molecular weight of 380,000 and a melting point of 100° C.

Example 2

First, after purging a 500 ml reactor with nitrogen, 8.5 g of dimethyl terephthalate and 25 g of 1,4-butanediol are added to a reactor, and the mixture is ester-exchange reacted until the approximate theoretical amount of methanol is produced at the temperature of 200° C. And then, 5.9 g of succinic acid and 7.3 g of adipic acid are added thereto, and the mixture is esterified until the approximate theoretical amount of water is produced at the temperature of 180° C., thus obtain 28 g of "aromatic-aliphatic prepolymers" wherein the number average molecular weight of "aromatic-aliphatic prepolymers" is approximately 10,000.

And then, 107 g of succinic acid, 14.6 g of adipic acid, 135 g of 1,4-butanediol and 0.4 g of tetrabutyl titanate acting as a catalyst are added thereto, and it reacts for 2 hours until the approximate theoretical amount of water is produced at the temperature of 200° C. At the end of this reaction step, 0.1 g of antimony trioxide, 0.2 g of dibutyltin oxide and 0.07 g of tetrabutyl titanate acting as catalysts and 0.2 g of trimethyl phosphate acting as a stabilizer are added thereto.

Finally, the temperature is elevated to 245° C. and polycondensation (or condensation-polymerization) is allowed to proceed for 200 minutes under 0.3 Torr vacuum condition.

The product has a melt index of 7 g/10 min. (190° C., 2,160 g), a number average molecular weight of 39,000, a weight average molecular weight of 290,000 and a melting point of 98° C.

Example 3

First, after purging a 500 ml reactor with nitrogen, 5.91 g of terephthalic acid and 12.6 g of 1,4-butanediol are added to a reactor, and the mixture is esterified until the approximate theoretical amount of water is produced at the temperature of 200° C. And then, 4.72 g of succinic acid is added thereto, and the mixture is esterified until the approximate theoretical amount of water is produced at the temperature of 180° C., thus obtain 13 g of "aromatic-aliphatic prepolymers" wherein the number average molecular weight of "aromatic-aliphatic prepolymers" is approximately 400.

And then, 118 g of succinic acid, 92 g of ethylene glycol and 0.4 g of tetrabutyl titanate acting as a catalyst are added thereto, and it reacts for 2 hours until the approximate theoretical amount of water is produced at the temperature of 200° C. At the end of this reaction step, 0.1 g of antimony trioxide, 0.2 g of dibutyltin oxide and 0.07 g of tetrabutyl titanate acting as catalysts and 0.2 g of trimethyl phosphate acting as a stabilizer are added thereto.

Finally, the temperature is elevated to 245° C. and polycondensation (or condensation-polymerization) is allowed to proceed for 220 minutes under 0.3 Torr vacuum condition.

The product has a melt index of 10 g/10 min. (190° C., 2,160 g), a number average molecular weight of 41,000, a weight average molecular weight of 380,000 and a melting point of 95° C.

Example 4

First, after purging a 500 ml reactor with nitrogen, 9.85 g of dimethyl terephthalate and 18 g of 1,4-butanediol are added to a reactor, and the mixture is ester-exchange reacted until the approximate theoretical amount of methanol is produced at the temperature of 200° C. And then, 4.72 g of succinic acid and 5.84 g of adipic acid are added thereto, and the mixture is esterified until the approximate theoretical amount of water is produced at the temperature of 180° C., thus obtain 26 g of "aromatic-aliphatic prepolymers" wherein the number average molecular weight of "aromatic-aliphatic prepolymers" is approximately 2,000.

And then, 118 g of succinic acid, 135 g of 1,4-butanediol and 0.5 g of tetrabutyl titanate acting as a catalyst are added thereto, and it reacts for 2 hours until the approximate theoretical amount of water is produced at the temperature of 200° C. At the end of this reaction step, 0.1 g of antimony trioxide, 0.2 g of dibutyltin oxide and 0.07 g of tetrabutyl titanate acting as catalysts and 0.2 g of trimethyl phosphate acting as a stabilizer are added thereto.

Finally, the temperature is elevated to 245° C. and polycondensation (or condensation-polymerization) is allowed to proceed for 200 minutes under 0.3 Torr vacuum condition.

The product has a melt index of 4 g/10 min. (190° C., 2,160 g), a number average molecular weight of 42,000, a weight average molecular weight of 400,000 and a melting point of 109° C.

Example 5

First, after purging a 500 ml reactor with nitrogen, 1.97 g of dimethyl terephthalate and 10.8 g of 1,4-butanediol are added to a reactor, and the mixture is ester-exchange reacted until the approximate theoretical amount of methanol is produced at the temperature of 200° C. And then, 2.36 g of succinic acid and 2.92 g of adipic acid are added thereto, and the mixture is esterified until the approximate theoretical amount of water is produced at the temperature of 180° C., thus obtain 9.9 g of "aromatic-aliphatic prepolymers" wherein the number average molecular weight of "aromatic-aliphatic prepolymers" is approximately 1,500.

And then, 118 g of succinic acid, 99 g of 1,4-butanediol, 18 g of ethylene glycol and 0.1 g of tetrabutyl titanate acting as a catalyst are added thereto, and it reacts for 2 hours until the approximate theoretical amount of water is produced at the temperature of 200° C. At the end of this reaction step, 0.1 g of antimony trioxide, 0.2 g of dibutyltin oxide and 0.07 g of tetrabutyl titanate acting as catalysts and 0.2 g of trimethyl phosphate acting as a stabilizer are added thereto.

Finally, the temperature is elevated to 245° C. and polycondensation (or condensation-polymerization) is allowed to proceed for 210 minutes under 0.3 Torr vacuum condition.

The product has a melt index of 9 g/10 min. (190° C., 2,160 g), a number average molecular weight of 33,000, a weight average molecular weight of 190,000 and a melting point of 98° C.

Example 6

The "aromatic-aliphatic prepolymers" with number average molecular weight of approximately 500 was obtained following the same procedure as in Example 1.

After purging a 500 ml reactor with nitrogen, 10 g of "aromatic-aliphatic prepolymers" with number average molecular weight of approximately 500, 107 g of succinic acid, 14.6 g of adipic acid, 108 g of 1,4-butanediol, 6.2 g of ethylene glycol and 0.35 g of tetrabutyl titanate acting as a catalyst are added thereto, and it reacts for 2 hours until the approximate theoretical amount of water is produced at the temperature of 200° C. At the end of this reaction step, 0.1 g of antimony trioxide, 0.2 g of dibutyltin oxide and 0.1 g of tetrabutyl titanate acting as catalysts and 0.2 g of trimethyl phosphate acting as a stabilizer are added thereto.

Finally, the temperature is elevated to 244° C. and polycondensation (or condensation-polymerization) is allowed to proceed for 220 minutes under 0.3 Torr vacuum condition.

The product has a melt index of 5 g/10 min. (190° C., 2,160 g), a number average molecular weight of 38,000, a weight average molecular weight of 250,000 and a melting point of 91° C.

Example 7

The "aromatic-aliphatic prepolymers" with number average molecular weight of approximately 10,000 was obtained following the same procedure as in Example 2.

After purging a 500 ml reactor with nitrogen, 10 g of "aromatic-aliphatic prepolymers" with number average molecular weight of approximately 10,000, 107 g of succinic acid, 14.6 g of adipic acid, 135 g of 1,4-butanediol and 0.4 g of tetrabutyl titanate acting as a catalyst are added thereto, and it reacts for 2 hours until the approximate theoretical amount of water is produced at the temperature of 200° C. At the end of this reaction step, 0.1 g of antimony trioxide, 0.2 g of dibutyltin oxide and 0.1 g of tetrabutyl titanate acting as catalysts and 0.2 g of trimethyl phosphate acting as a stabilizer are added thereto.

Finally, the temperature is elevated to 243° C. and polycondensation (or condensation-polymerization) is allowed to proceed for 210 minutes under 0.3 Torr vacuum condition.

The product has a melt index of 9 g/10 min. (190° C., 2,160 g), a number average molecular weight of 34,000, a weight average molecular weight of 210,000 and a melting point of 104° C.

Example 8

The "aromatic-aliphatic prepolymers" with number average molecular weight of approximately 400 was obtained following the same procedure as in Example 3.

After purging a 500 ml reactor with nitrogen, 6 g of "aromatic-aliphatic prepolymers" with number average molecular weight of approximately 400, 146 g of adipic acid, 135 g of 1,4-butanediol and 0.4 g of tetrabutyl titanate acting as a catalyst are added thereto, and it reacts for 2 hours until the approximate theoretical amount of water is produced at the temperature of 200° C. At the end of this reaction step, 0.1 g of antimony trioxide, 0.2 g of dibutyltin oxide and 0.1 g of tetrabutyl titanate acting as catalysts and 0.2 g of trimethyl phosphate acting as a stabilizer are added thereto.

Finally, the temperature is elevated to 242° C. and polycondensation (or condensation-polymerization) is allowed to proceed for 210 minutes under 0.3 Torr vacuum condition.

The product has a melt index of 3 g/10 min. (190° C., 2,160 g), a number average molecular weight of 42,000, a weight average molecular weight of 390,000 and a melting point of 59° C.

Comparative Example 1

After purging a 500 ml reactor with nitrogen, 108 g of 1,4-butanediol and 118 g of succinic acid are added to a heat-melting condensation reactor. After the temperature is elevated under an atmosphere of nitrogen, esterification is allowed for 5 hours at the temperature of from 140° C. to 200° C., and esterification is continually allowed for 1.5 hours under 20 to 2 mmHg pressure.

And then, 0.2 g of tetraisopropyl titanate acting as a catalyst is added thereto. Then, the de-glycol reaction is allowed for 6 hours under 15 to 0.2 mmHg pressure at the temperature of 220° C.

The product has a number average molecular weight of 16,100, a weight average molecular weight of 44,100 and a melting point of 118° C.

Comparative Example 2

After purging a 500 ml reactor with nitrogen, 92 g of ethylene glycol, 118 g of succinic acid and 0.07 g of tetrabutyl titanate acting as a catalyst are added to a heat-melting condensation reactor. After the temperature is elevated under an atmosphere of nitrogen, esterification is allowed for 2 hours at the temperature of 200° C. and esterification is continually allowed for 0.5 hours under 20 to 2 mmHg pressure.

Next, 0.07 g of tetrabutyl titanate and 0.45 g of dibutyltin oxide acting as catalysts, and 0.2 g of trimethyl phosphate acting as a stabilizer are added thereto under atmosphere of nitrogen. Then, the de-glycol reaction is allowed for 18 hours under 15 to 0.2 mmHg pressure at the temperature of 250° C.

The product has a number average molecular weight of 9,000, a weight average molecular weight of 32,000 and a melting point of 100° C.

Comparative Example 3

After purging a 500 ml reactor with nitrogen, 108 g of 1,4-butanediol, 21.9 g of adipic acid and 100.3 g of succinic acid are added to a heat-melting condensation reactor. After the temperature is elevated under an atmosphere of nitrogen, esterification is allowed for 2 hours at the temperature of 200° C. and esterification is continually allowed for 0.5 hours under 20 to 2 mmHg pressure.

Next, 0.07 g of tetraisopropyl titanate and 0.45 g of dibutyltin oxide acting as catalysts, and 0.2 g of trimethyl phosphate acting as a stabilizer are added thereto under atmosphere of nitrogen. Then, the de-glycol reaction is allowed for 3.2 hours under 15 to 0.2 mmHg pressure at the temperature of 250° C.

The product has a number average molecular weight of 31,000, a weight average molecular weight of 84,000 and a melting point of 95° C.

Comparative Example 4

After purging a 500 ml reactor with nitrogen, 180 g of 1,4-butanediol, 94.5 g of succinic acid, 29.2 g of adipic acid and 0.87 ml of titanium isopropoxide in n-butanol solution (1.02 wt/vol % Ti) acting as a catalyst, and 0.178 g of ULTRANOX 626(0.1 wt %) (produced by GE Specialty Chemicals Co.) acting as a stabilizer are added to a reactor. The mixture was heated with stirring under nitrogen at 200° C. for 1.0 hour, at 210° C. for 1.0 hour and at 220° C. for 0.5 hour. The reaction temperature was then increased to 260° C.

After stabilizing at 260° C., the internal pressure was reduced to 0.2 mmHg, and the reaction was continued for 3.5 hours. The resulting copolymer was white and semicrystalline.

The product has a number average molecular weight of 32,400, a weight average molecular weight of 83,400 and a melting point of 95.4° C.

Comparative Example 5

After purging a 500 ml reactor with nitrogen, 51.5 g of 1,4-butanediol, 59.1 g of succinic acid, 45.6 g of diethylene glycol and 0.71 ml of titanium isopropoxide in n-butanol solution (1.25 wt/vol % Ti) acting as a catalyst are added to a reactor. The mixture was heated with stirring under nitrogen at 200° C. for 1.0 hour, at 210° C. for 1.0 hour and at 220° C. for 1.0 hour. The reaction temperature was then increased to 250° C. After stabilizing at 250° C., the internal pressure was reduced to 0.3 mmHg, and the reaction was continued for 2.0 hours. The resulting copolymer was pale yellow and semicrystalline.

The product has a number average molecular weight of 64,400, a weight average molecular weight of 126,000 and a melting point of 91.5° C.

Comparative Example 6

After purging a 500 ml reactor with nitrogen, 90.0 g of 1,4-butanediol, 59.1 g of succinic acid and 0.84 ml of titanium isopropoxide in n-butanol solution (1.02 wt/vol % Ti) acting as a catalyst are added to a reactor. The mixture was heated with stirring under nitrogen at 200° C. for 1.0 hour, at 210° C. for 1.0 hour and at 220° C. for 1.0 hour. The reaction temperature was then increased to 250° C. After stabilizing at 250° C., the internal pressure was reduced to 0.2 mmHg, and the reaction was continued for 3.5 hours. The resulting copolymer was pale yellow and semicrystalline.

The product has a number average molecular weight of 40,000, a weight average molecular weight of 101,000 and a melting point of 120.8° C.

Comparative Example 7

After purging a 500 ml reactor with nitrogen, 146 g of dimethyl succinate, 162 g of 1,4-butanediol and 0.03 g of tetrabutyl titanate acting as a catalyst are added to a heat-melting condensation reactor, and the mixture is reacted until the approximate theoretical amount of methanol is produced at the temperature of 200° C.

After the completion of ester-exchange reaction, 0.3 g of tetrabutyl titanate, 0.8 g of dibutyltin oxide acting as catalysts, and 0.4 g of trimethyl phosphate, 0.01 g of cobalt acetate acting as stabilizers are added thereto slurried in 1,4-butanediol. And then it was mixed for 10 minutes at the temperature of 230° C.

Then the polycondensation (or condensation polymerization) is allowed for 5 hours under 3 mmHg pressure at the temperature of 250° C.

The product has a number average molecular weight of 44,700, and a weight average molecular weight of 94,000 and a melting point of 118° C.

Comparative Example 8

After purging a 500 ml reactor with nitrogen, 84.4 g of succinic acid, 13.2 g of glutaric acid, 14.6 g of adipic acid, 112.4 g of 1,4-butanediol and 0.03 g of tetrabutyl titanate acting as a catalyst are added to a heat-melting condensation reactor, and the mixture is reacted until the approximate theoretical amount of water is produced at the temperature of 200° C.

After the completion of esterification reaction, 0.3 g of tetrabutyl titanate, 0.8 g of dibutyltin oxide acting as catalysts, and 0.4 g of trimethyl phosphate, 0.01 g of cobalt acetate acting as stabilizers are added thereto slurried in 1,4-butanediol. And then it was mixed for 10 minutes at the temperature of 230° C.

Then the polycondensation (or condensation polymerization) is allowed for 5 hours under 3 mmHg pressure at the temperature of 250° C.

The product has a number average molecular weight of 33,400, and a weight average molecular weight of 87,000 and a melting point of 93° C.

Comparative Example 9

After purging a 500 ml reactor with nitrogen, 146 g of dimethyl succinate, 38 g of 1,3-propanediol, 117.1 g of 1,4-butanediol and 0.03 g of tetrabutyl titanate acting as a catalyst are added to a heat-melting condensation reactor, and the mixture is reacted until the approximate theoretical amount of methanol is produced at the temperature of 200° C.

After the completion of ester-exchange reaction, 0.3 g of tetrabutyl titanate, 0.8 g of dibutyltin oxide acting as catalysts, and 0.4 g of trimethyl phosphate, 0.01 g of cobalt acetate acting as stabilizers are added thereto slurried in 1,4-butanediol. And then it was mixed for 10 minutes at the temperature of 230° C.

Then the polycondensation (or condensation polymerization) is allowed for 5 hours under 3 mmHg pressure at the temperature of 250° C.

The product has a number average molecular weight of 30,100, and a weight average molecular weight of 75,000 and a melting point of 84° C.

The properties of the copolyester resin of the present invention according to the examples 1 to 8 and the conventional polyester resin according to the comparative examples 1 to 9 are provided in Table 1.

As shown in table 1, the copolyester resin of the present invention is a high molecular weighted polymer both in number average and in weight average, and has good processability and superior physical properties, so it can be used in many practical uses including packaging film and trash bags

TABLE 1

| | EXAMPLE | | | | | | | |
|---|---|---|---|---|---|---|---|---|
| | 1 | 2 | 3 | 4 | 5 | 6 | 7 | 8 |
| Succinic acid | 118 | 107 | 118 | 118 | 118 | 107 | 107 | |
| Adipic acid | | 14.6 | | | | 14.6 | 14.6 | 146 |
| Ethylene glycol | | | 92 | | 18 | 6.2 | | |
| 1,4-butanediol | 135 | 135 | | 135 | 99 | 108 | 135 | 135 |
| Glutaric acid | | | | | | | | |
| Dimethyl succinate | | | | | | | | |
| "aromatic-aliphatic prepolymers" having Mn of 300 to 30,000 | 39.4 | 28 | 13 | 26 | 9.9 | 10 | 10 | 6 |
| 1,3-propanediol | | | | | | | | |
| Diethylene glycol | | | | | | | | |
| Tear strength (g/$\mu$m) MD/TD | 6.1/ 8.3 | 5.5/ 7.8 | 5.1/ 8.0 | 6.4/ 8.9 | 5.2/ 7.0 | 6.4/ 7.9 | 5.4/ 8.1 | 6.0/ 8.3 |
| Mn | 47,000 | 39,000 | 41,000 | 42,000 | 33,000 | 38,000 | 34,000 | 42,000 |
| Mw | 380,000 | 290,000 | 380,000 | 400,000 | 190,000 | 250,000 | 210,000 | 390,000 |
| Tensile strength (kg/cm$^2$) | 354 | 417 | 335 | 350 | 405 | 402 | 420 | 340 |
| Elongation (%) | 250 | 700 | 200 | 200 | 350 | 800 | 600 | 220 |
| MI (g/10 min) | 3 | 7 | 10 | 4 | 9 | 5 | 9 | 3 |
| Melting point (° C.) | 100 | 98 | 95 | 109 | 98 | 91 | 104 | 59 |
| Processability | P | P | P | P | P | P | P | P |

| | COMPARATIVE EXAMPLE | | | | | | | | |
|---|---|---|---|---|---|---|---|---|---|
| | 1 | 2 | 3 | 4 | 5 | 6 | 7 | 8 | 9 |
| Succinic acid | 118 | 118 | 100.3 | 94.5 | 59.1 | 59.1 | | 84.4 | |
| Adipic acid | | | 21.9 | 29.2 | | | | 14.6 | |
| Ethylene glycol | | 92 | | | | | | | |
| 1,4-butanediol | 108 | | 108 | 180 | 51.5 | 90 | 162 | 112.4 | 117.1 |
| Glutaric acid | | | | | | | | 13.2 | |
| Dimethyl succinate | | | | | | | 146 | | 146 |
| "aromatic-aliphatic prepolymers" having Mn of 300 to 30,000 | | | | | | | | | |
| 1,3-propanediol | | | | | | | | | 38 |
| Diethylene glycol | | | | | 45.6 | | | | |
| Tear strength (g/$\mu$m) MD/TD | — | — | — | — | — | — | — | — | — |
| Mn | 16,100 | 9,000 | 31,000 | 32,400 | 64,400 | 40,000 | 44,700 | 33,400 | 30,100 |
| Mw | 44,100 | 32,000 | 84,000 | 83,400 | 126,000 | 101,000 | 94,000 | 87,000 | 75,000 |
| Tensile strength (kg/cm$^2$) | 130 | — | 270 | 257 | — | 151 | 310 | 320 | 280 |
| Elongation (%) | 100 | — | 300 | 15 | — | 2.1 | 70 | 300 | 400 |
| MI (g/10 min) | NA | NA | NA | 70 | 40 | 50 | 45 | 70 | 85 |
| Melting point (° C.) | 118 | 100 | 95 | 95.4 | 91.5 | 120.8 | 118 | 93 | 84 |
| Processability | PI | PI | PI | PI | PI | PI | PI | PI | PI |

Mn: number average molecular weight,
Mw: weight average molecular weight
P: Processable,
IP: Processing Impossible,
NA: Not applicable (too high MI)

THE ADVANTAGES OF THE PRESENT INVENTION

The present invention suggests a copolyester resin composition which has good physical properties and processability, wherein: (i) an "aromatic-aliphatic prepolymers" having number average molecular weight of 300 to 30,000; (ii) one or a plurality of aliphatic (including cyclic type) dicarboxylic acid (or an acid anhydride thereof); and (iii) one or a plurality of aliphatic (including cyclic type) glycol, wherein the copolyester resin has a number average molecular weight of from 30,000 to 70,000, a weight average molecular weight of from 100,000 to 600,000, melting point of from 55° C. to 120° C., and melt index of from 0.1 to 30 g/10 min. (190° C., 2,160 g), and the process for preparing and/or producing the same. The conventional aliphatic polyester cannot be used in many applications because of its poor physical properties, especially, tensile strength and tear strength. But the copolyester resin of present invention can be used in many practical uses including packaging film and trash bags. The processability and physical properties of the copolyester resin of present invention has been greatly enhanced by incorporating (i) an "aromatic-aliphatic prepolymers" having number average molecular weight of from 300 to 30,000 and the contiguous repeating unit of aromatic group in the dicarboxylic acid position of "aromatic-aliphatic prepolymers" is less than 5. Thus it can be processed by using the conventional polyethylene, polypropylene processing equipment without any modification. The environmental problem of plastic which causes worldwide concern can be solved by commercializing biodegradable copolyester which can be transform into carbon dioxide and water in the environment.

What is claimed is:

1. A copolyester resin composition having number average molecular weight of from 30,000 to 70,000, determined by GPC, comprising;
   (i) 0.1 to 30% by weight of aromatic-aliphatic prepolymers prepared by a reaction selected from the group consisting of the following reactions; condensation reaction, an esterification reaction, and an ester-exchange reaction with
      (a) one or a plurality of aromatic dicarboxylic acid (or an acid anhydride thereof);
      (b) one or a plurality of aliphatic dicarboxylic acid (or an acid anhydride thereof); and
      (c) one or a plurality of aliphatic glycol selected from the group consisting of 1,4-butanediol and ethylene glycol;
   (ii) 40 to 71% by weight of an aliphatic or cycloaliphatic dicarboxylic acid (or an acid anhydride thereof); and
   (iii) 29 to 60% by weight of an aliphatic or cycloaliphatic glycol or a and-the mixture thereof.

2. The copolyester resin composition according to claim 1, wherein said copolyester resin composition has weight average molecular weight of from 100,000 to 600,000, determined by GPO; melting point of from 55° C. to 125° C., determined by DSC; and melt index of from 0.1 to 30 g/10 min. (190° C., 2,160 g) determined by ASTM D1238.

3. The copolyester resin composition according to claim 1, wherein said aromatic-aliphatic prepolymer has number average molecular weight of from 300 to 30,000.

4. The copolyester resin composition according to claim 1, wherein the mole ratio of the total dicarboxylic acid to the aliphatic glycol in the aromatic-aliphatic prepolymer is from 1:1.1 to 1:1.5.

5. The copolyester resin composition according to claim 4, wherein the mole ratio of the aromatic dicarboxylic acid to aliphatic dicarboxylic acid is from 0.2:0.8 to 0.8:0.2.

6. The copolyester resin composition according to claim 1, wherein said aliphatic dicarboxylic acid is at least one selected from the group consisting of succinic acid, glutaric acid, adipic acid, pimelic acid, suberic acid, azelaic acid, sebacic acid, 1,9-nonanedicarboxylic acid, and 1,10-decanedicarboxylic acid or acid anhydrides thereof.

7. The copolyester resin composition according to claim 1, wherein said aliphatic glycol is at least one selected from the group consisting of ethylene glycol, diethylene glycol, triethylene glycol, tetraethylene glycol, propylene glycol, 1,3-propanediol, 1,3-butanediol, 1,4-butanediol, neopentyl glycol, 1,5-pentanediol, 1,6-hexanediol, 1,7-heptanediol, 1,2-octanediol, 1,8-octanediol, 1,9-nonanediol, 1,2-decanediol, 1,10-decanediol and decamethylene glycol.

8. The copolyester resin composition according to claim 1, wherein said aromatic dicarboxylic acid(or an acid anhydride thereof) is at least one selected from the group consisting of dimethyl terephthalate, terephthalic acid, phthalic acid, phthalic anhydride, isophthalic acid, 4-methylphthalic acid, 4-methylphthalic anhydride and dimethyl phthalate.

9. A method for preparing a high molecular weight copolyester resin comprising;
   a first step of preparing an aromatic-aliphatic prepolymers having number average molecular weight of from 300 to 30,000 comprising reactions which are selected from at least one of condensation, esterification, and ester-exchange reaction with one or a plurality of aromatic dicarboxylic acid (or an acid anhydride thereof), one or a plurality of aliphatic or cycloaliphatic glycol and an aliphatic or cycloaliphatic dicarboxylic acid (or an acid anhydride thereof) at the temperature from 160° C. to 270° C.;
   a second step of preparing polymeric resin comprising reactions which are selected from one of esterification and ester-exchange reaction with the aromatic-aliphatic prepolymers of the first step, one or a plurality of aliphatic or cycloaliphatic dicarboxylic acid (or an acid anhydride thereof) and one or a plurality of aliphatic or cycloaliphatic glycol at the temperature of from 200° C. to 220°; and
   a third step of performing a polycondensation of the polymeric resin of the second step at the temperature of from 210° C. to 270° C. under 0.005 to 10 Torr.

10. The method for preparing copolyester resin according to claim 9, wherein the mole ratio of the total dicarboxylic acid (or an acid anhydride thereof) to the aliphatic glycol is from 1:1.1 to 1:1.5.

11. The method for preparing copolyester resin according to claim 9, wherein the mole ratio of the aromatic dicarboxylic acid to aliphatic dicarboxylic acid is from 0.2:0.8 to 0.8:0.2.

12. The method for preparing copolyester resin according to claim 9, wherein from 0.02 wt % to 2 wt % of a catalyst is presented at the start or at the end of the esterification or ester-exchange reaction in the first and second reaction step.

13. The method for preparing copolyester resin according to the claim 12, wherein said catalyst is at least one selected from the group consisting of tetrabutyl titanate, calcium acetate, antimony trioxide, dibutyltin oxide, zinc acetate, antimony acetate, antimony glycolate, and tetrapropyl titanate.

14. The method for preparing copolyester resin according to claim 9, wherein from 0.02 wt % to 2 wt % of a stabilizer is presented at the start or at the end of the esterification or ester-exchange reaction in the first and/or second reaction step.

15. The method for preparing copolyester resin according to the claim 14, wherein the stabilizer is at least one selected from the group consisting of trimethyl phosphate, phosphoric acid and triphenyl phosphate.

* * * * *